(12) United States Patent
Wang et al.

(10) Patent No.: US 9,851,465 B2
(45) Date of Patent: Dec. 26, 2017

(54) APPARATUS AND METHODS FOR COMMUNICATING DOWNHOLE DATA

(71) Applicant: Well Resolutions Technology, Houston, TX (US)

(72) Inventors: Tsili Wang, Houston, TX (US); Borislav J. Tchakarov, Houston, TX (US)

(73) Assignee: Well Resolutions Technology, Houston, TX (US)

( * ) Notice: Subject to any disclaimer, the term of this patent is extended or adjusted under 35 U.S.C. 154(b) by 222 days.

(21) Appl. No.: 14/308,393

(22) Filed: Jun. 18, 2014

(65) Prior Publication Data

US 2014/0368350 A1    Dec. 18, 2014

Related U.S. Application Data

(60) Provisional application No. 61/836,577, filed on Jun. 18, 2013.

(51) Int. Cl.
| | |
|---|---|
| *G01V 3/00* | (2006.01) |
| *E21B 47/12* | (2012.01) |
| *G01V 3/28* | (2006.01) |
| *E21B 47/01* | (2012.01) |

(52) U.S. Cl.
CPC .............. *G01V 3/00* (2013.01); *E21B 47/011* (2013.01); *E21B 47/12* (2013.01); *E21B 47/122* (2013.01); *G01V 3/28* (2013.01)

(58) Field of Classification Search
CPC ...... E21B 47/122; E21B 47/011; E21B 47/12; G01V 3/00; G01V 3/28

USPC ...................................... 340/854.4
See application file for complete search history.

(56) References Cited

U.S. PATENT DOCUMENTS

| | | | | |
|---|---|---|---|---|
| 4,770,034 | A | 9/1988 | Titchener et al. | |
| 5,351,532 | A * | 10/1994 | Hager | E21B 47/011 250/254 |
| 5,359,324 | A * | 10/1994 | Clark | E21B 17/1078 324/333 |
| 5,402,068 | A * | 3/1995 | Meador | G01V 3/30 324/338 |

(Continued)

FOREIGN PATENT DOCUMENTS

EP    0553908 A2    8/1993

OTHER PUBLICATIONS

Invitation to Pay Additional Fees (PCT/US2014/043026), dated Sep. 26, 2014.

(Continued)

*Primary Examiner* — George Bugg
*Assistant Examiner* — Thang Tran
(74) *Attorney, Agent, or Firm* — Lloyd L. Davis; Andrews Kurth Kenyon LLP (57) ABSTRACT

A tool for communicating data between multiple locations downhole includes a tool body, a first antenna including at least one electrode disposed within a wall and electrically insulated from the tool body, and an electronic circuit configured to generate an encoded electrical signal and propagate the encoded signal through the electrode into a medium surrounding the tool, and a second antenna coupled to the tool body, and an electronic circuit configured to receive an electrical signal induced by the second antenna.

19 Claims, 6 Drawing Sheets

(56) References Cited

U.S. PATENT DOCUMENTS

| | | | | |
|---|---|---|---|---|
| 5,501,285 | A * | 3/1996 | Lamine | E21B 10/60 175/27 |
| 6,188,222 | B1 * | 2/2001 | Seydoux | E21B 47/12 175/50 |
| 6,577,244 | B1 | 6/2003 | Clark et al. | |
| 7,902,827 | B2 * | 3/2011 | Forgang | G01V 3/24 324/338 |
| 2002/0020533 | A1 | 2/2002 | Tubel | |
| 2002/0122464 | A1 * | 9/2002 | Dodge | H04L 23/02 375/141 |
| 2004/0061622 | A1 | 4/2004 | Clark | |
| 2004/0119476 | A1 * | 6/2004 | Homan | G01V 3/28 324/342 |
| 2006/0164256 | A1 | 7/2006 | Hudson | |
| 2007/0284098 | A1 | 12/2007 | Miller, Jr. et al. | |
| 2008/0156534 | A1 | 7/2008 | Clark et al. | |
| 2009/0289808 | A1 * | 11/2009 | Prammer | E21B 17/003 340/853.7 |
| 2010/0065329 | A1 * | 3/2010 | Zientarski | G01V 11/002 175/24 |
| 2011/0006773 | A1 * | 1/2011 | Bittar | E21B 7/046 324/333 |
| 2011/0205847 | A1 * | 8/2011 | Lemenager | E21B 47/16 367/82 |
| 2013/0030707 | A1 * | 1/2013 | Tabarovsky | G01V 3/24 702/11 |
| 2013/0043874 | A1 * | 2/2013 | Clark | E21B 10/00 324/369 |
| 2013/0265171 | A1 * | 10/2013 | Hay | E21B 17/003 340/854.4 |
| 2015/0337649 | A1 * | 11/2015 | Donderici | G01V 3/26 340/854.5 |

OTHER PUBLICATIONS

PCT Search Report & Written Opinion (PCT/US2014/043026), dated Jan. 14, 2015.
Supplementary European Search Report (EP 14814158), dated Feb. 15, 2017.

* cited by examiner

APPARATUS AND METHODS FOR COMMUNICATING DOWNHOLE DATA

CROSS-REFERENCE TO RELATED APPLICATIONS

This application claims priority under 35 U.S.C. §119(e) to U.S. Provisional Application No. 61/836,577 filed Jun. 18, 2013, which is incorporated herein by reference in its entirety.

FIELD

In one aspect, embodiments relate to apparatus and methods for communicating downhole data, and more particularly, an apparatus methods for transmitting data between subs by short-hop telemetry.

BACKGROUND AND SUMMARY

Telemetry is the automated communications process by which measurements are made and other data collected at remote or inaccessible points and transmitted to receiving equipment for monitoring. Telemetry is used to transmit drilling mechanics and formation evaluation information uphole, in real time, as a well is drilled. This information is used in formation evaluation, drilling optimization, and geosteering, among others.

In one aspect, embodiments disclosed herein relate to a tool for communicating data between multiple locations downhole including a tool body, a first antenna including at least one electrode disposed within a wall and electrically insulated from the tool body, and an electronic circuit configured to generate an encoded electrical signal and propagate the encoded signal through the electrode into a medium surrounding the tool, and a second antenna coupled to the tool body, and an electronic circuit configured to receive an electrical signal induced by the second antenna.

In another aspect, embodiments disclosed herein relate to a downhole data communication system disposed in a drill string, the system including a transmitting antenna coupled to the drill string including an electrode electrically insulated from the drill string, an electronic driving circuit for generating an electrical signal, a first metal wire connecting the electronic driving circuit to the electrode, wherein the first metal wire does not contact the drill string, and a second metal wire connecting the electronic driving circuit to the drill string, wherein the second metal wire does not contact the electrode. The system further includes a receiving antenna coupled to the drill string including an electrode electrically insulated from the drill string, an electronic receiving circuit for receiving an electrical potential difference between the electrode and the drill string, a first metal wire connecting the electronic receiving circuit to the electrode, wherein the first metal wire does not contact the drill string, and a second metal wire connecting the electronic receiving circuit to the drill string, wherein the second metal wire does not contact the electrode.

In yet other aspects, embodiments disclosed herein relate to a method of communicating data between multiple locations downhole including providing a tool body including an electrode-based transmitting antenna coupled with an electronic circuit at a first location, and a receiving antenna coupled with an electronic circuit at a second location, encoding a signal comprising data to be transmitted in the electronic circuit of the transmitting antenna, driving the encoded signal to the electrode-based transmitting antenna, transmitting the encoded signal through a medium surrounding the tool body, receiving the encoded signal at the receiving antenna, and decoding the signal to recover transmitted data.

DETAILED DESCRIPTION

A short-hop telemetry system suitable for transmitting information and data in any downhole environment is disclosed. The system may be used to communicate information along any length of drill string which is capable of forming an axial conducting loop and may be used to communicate information along the drill string either in a first direction, from a first axial position to a second axial position, or in a second direction, from the second axial position to the first axial position. Preferably, the system is capable of communicating information in both directions along the drill string so that information may be communicated either toward the surface or away from the surface of a wellbore.

Information communicated toward the surface using the system may typically relate to drilling operations or to the environment in which drilling is taking place, such as for example, weight-on-bit, natural gamma ray emissions, borehole inclination, formation resistivity, borehole pressure and other information. Information communicated away from the surface may typically relate to instructions sent from the surface, such as for example a signal from the surface prompting the system to send information back to the surface or instructions from the surface to alter drilling operations where a downhole motor drilling assembly is being used.

The short-hop telemetry system may be used in conjunction with a downhole motor drilling assembly, and preferably is used as a component of a measurement-while-drilling ("MWD") system providing communication to and from the surface during drilling operations. The system is intended to be incorporated into a drill string, or preferably into a downhole motor drilling assembly incorporated into a drill string.

Figure 1:
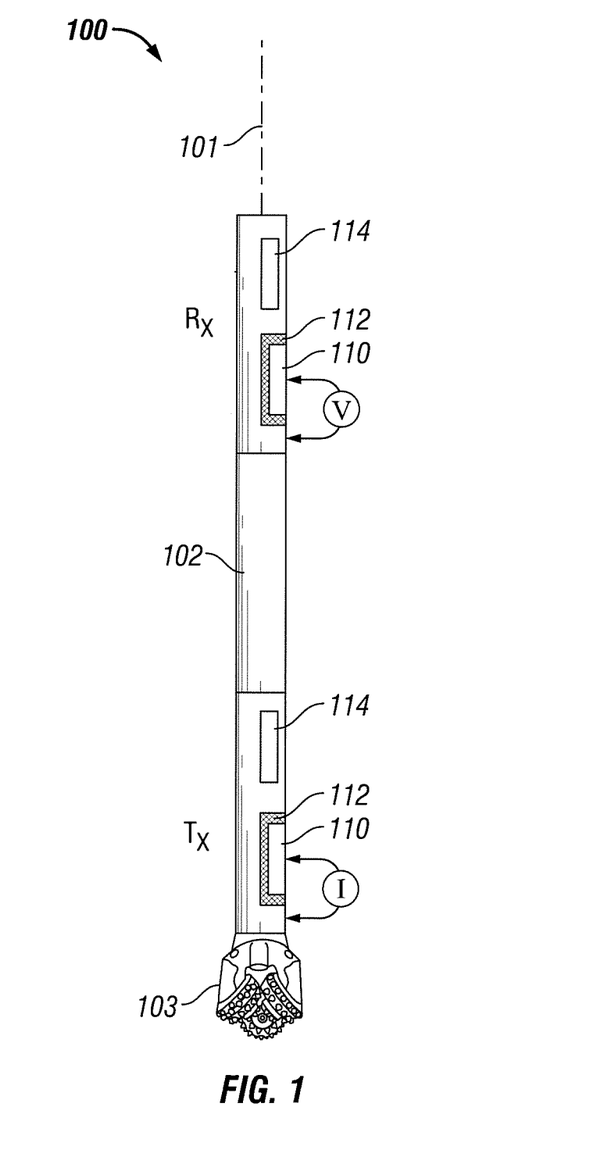
FIG. 1 illustrates an embodiment of a short-hop sensor for transmitting data between downhole subs.

FIG. 1 illustrates an embodiment of a short-hop telemetry apparatus 100 for transmitting data between downhole subs. The apparatus 100 includes a tool body 102 having a longitudinal axis 101, and at least one transmitting antenna $T_x$ and at least one receiving antenna $R_x$ placed at two different locations of the tool body 102. The transmitting antenna and the receiving antenna may be spaced apart by other subs (e.g., a mud motor, MWD/LWD tool sub). Each antenna includes at least one electrode of any shape and material. For example, the electrode may be made of metal (e.g., steel). The electrode may have any number of cross-sectional shapes, including but not limited to, circular, square, rectangle, or any other shape that can be made for downhole operations. Electrodes may have any diameter, preferably between approximately 0.1 inches and one inch. Electrodes may have any length depending on such factors as the space available on the tool body, the distance between the transmitting and receiver antennas, and the resistivity of the drilling mud, but preferably between approximately one inch and ten inches in length. An outer surface or outward-facing surface of the electrode may be exposed to drilling fluids in the wellbore. An inner surface or inward-facing surface of the electrode may be insulated from the tool body 102 by any type of insulating material. For example, insulating material may include but is not limited to rubber, polyether ether ketone ("PEEK"), fiberglass, or ceramic. The insulation layer may have any thickness, preferably between approximately 0.1 inches and one inch.

Figure 2:
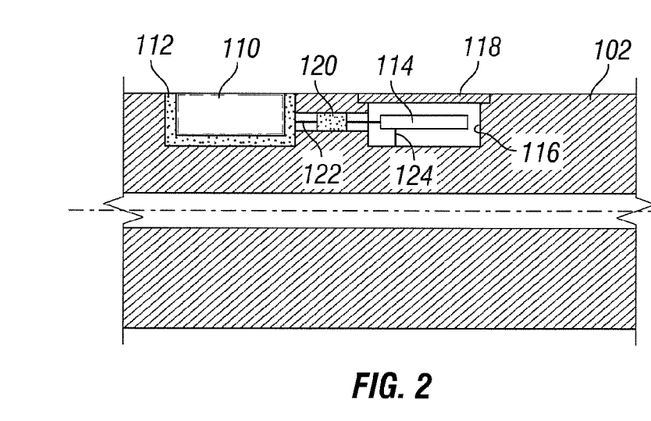
FIG. 2 illustrates an embodiment of a short-hop sensor antenna.
Figure 3A:
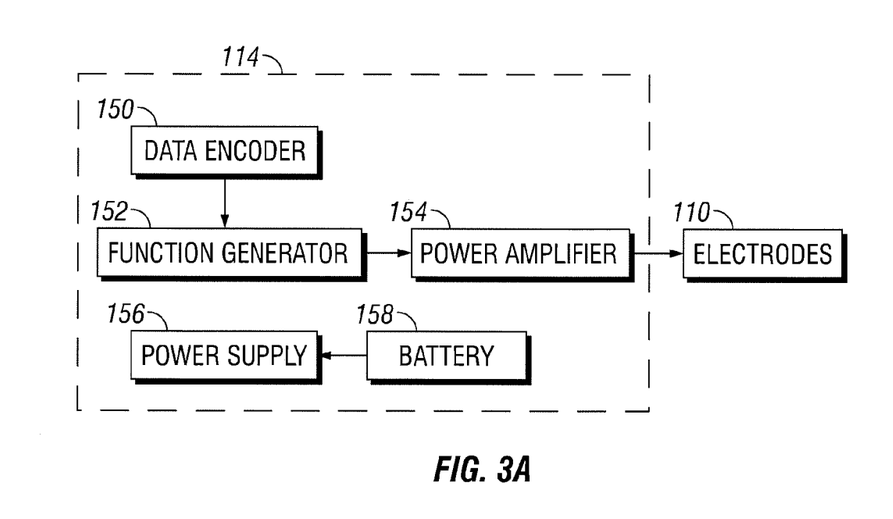
FIGS. 3A-B illustrate schematics of an electronic driving circuit and receiving circuit, respectively.

FIG. 2 illustrates a cross-section view of a transmitting antenna of the short-hop telemetry system. The tool body 102 often has a central bore aligned with the longitudinal axis 101. An electrode 110 is disposed within a wall of the tool body 102, and separated from the tool body 102 by an insulating layer 112. An electronic driving circuit 114 is disposed adjacent to the electrode 110 within a pocket 116 formed in a wall of the tool body 102. A cover 118 is placed over the pocket 116 and attached to the tool body 102. The pocket 116 may be pressure sealed. In one embodiment, electronic driving circuits 114 in the pocket 116 are configured to generate an electrical signal. A metal wire 122 connects the electronic driving circuit 114 and the electrode 110 through a pressure-sealed feed-through connector 120. The metal wire 122 does not make electrical contact with the tool 102. The wire 122 may be connected to the transmitting electrode 110 by soldering or through direct contact without soldering. A second wire 124 connects the electronic driving circuit 114 and the tool 102 body. The second wire 124 does not make electrical contact with the transmitting electrode 110. The second wire 124 may be connected to the tool body 102 by soldering or by bolts. FIG. 3A illustrates a schematic of an embodiment of an electronic driving circuit 114. The electronic driving circuit 114 may include but is not limited to a data encoder 150, function generator 152 and power amplifier 154. The power amplifier 154 may be coupled to a power supply 156 and battery 158.

Figure 3B:
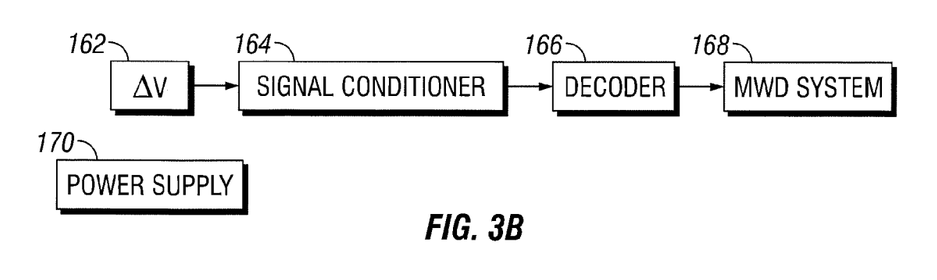

Receiving antennas $R_x$ generally include the same components as the transmitting antennas $T_x$, shown in FIG. 2, however the receiving antennas include electronic receiving circuits instead of driving circuits. The receiving circuits may include pre-amplifiers, amplifiers, filters, analog-to-digital converters, signal conditioners, and memory for data storage. As shown in FIG. 3B, an electrical potential difference 162 between the receiving electrode and the tool body may be determined, and fed through the receiving electronics and recorded in the memory for subsequent processing. The potential difference signal may also be transmitted, without be recorded in the memory, to another electronics system such as that in an MWD system 168 for decoding of the signal. The potential difference signal may be transmitted to a signal conditioner 164 and decoder 166 before reaching the MWD system 168. A power supply 170 may also be coupled to the receiving circuit.

Figure 4A:
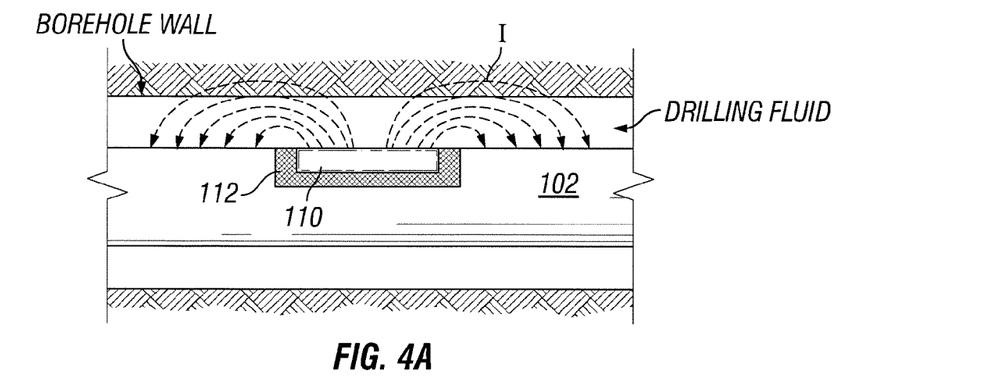
FIGS. 4A-B illustrate current paths from the antenna to the tool body.
Figure 4B:
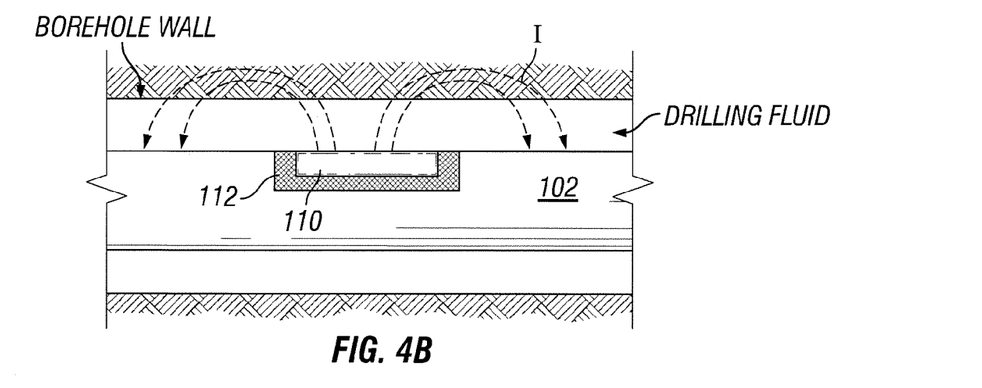

FIGS. 4A-B illustrate current departing the transmitting electrode 110. The current path I from the transmitting electrode 110 to the tool body 102 depends on the resistivity of the drilling fluid. For conducting drilling fluid, more current I returns to the tool body 102 in close proximity to the electrode 110 (FIG. 4A). For less conducting or non-conducting drilling fluid, current I returns to the tool body 102 at a larger distance from the electrode 100 (FIG. 4B). Generally, current departs the transmitting electrode, flows through the drilling fluid in the wellbore surrounding the tool body 102, and returns to the tool body at the receiving antenna. An electrical current may be applied to the transmitting electrode 110 at frequency ranging from a few hertz to a few kilohertz. The amount of electrical current may be adjusted according to the desired signal level from the receiving antenna.

Figure 5A:
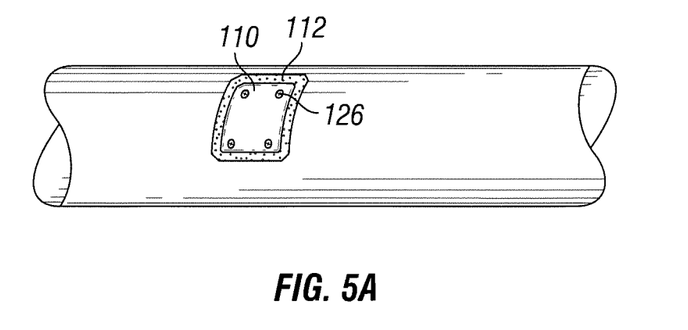
FIGS. 5A-B illustrate an embodiment of electrode attachment to the tool body.
Figure 5B:
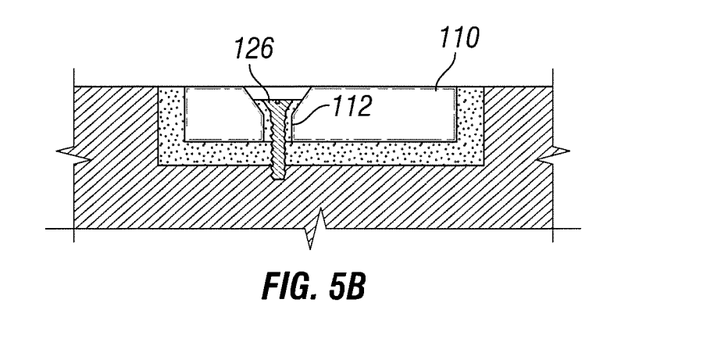

FIGS. 5A-B illustrate an embodiment of the sensor having electrodes 110 secured to the tool body 102 with bolts 126 or any other type of mechanical fasteners. The bolts 126 may be insulated from the electrode 110 by non-conducting insulating material 112 such as rubber, PEEK, fiberglass, ceramic or others. The bolts 126 may engage the tool body 102 in any number of ways, and any number of bolts 126 may be used.

Figure 6A:
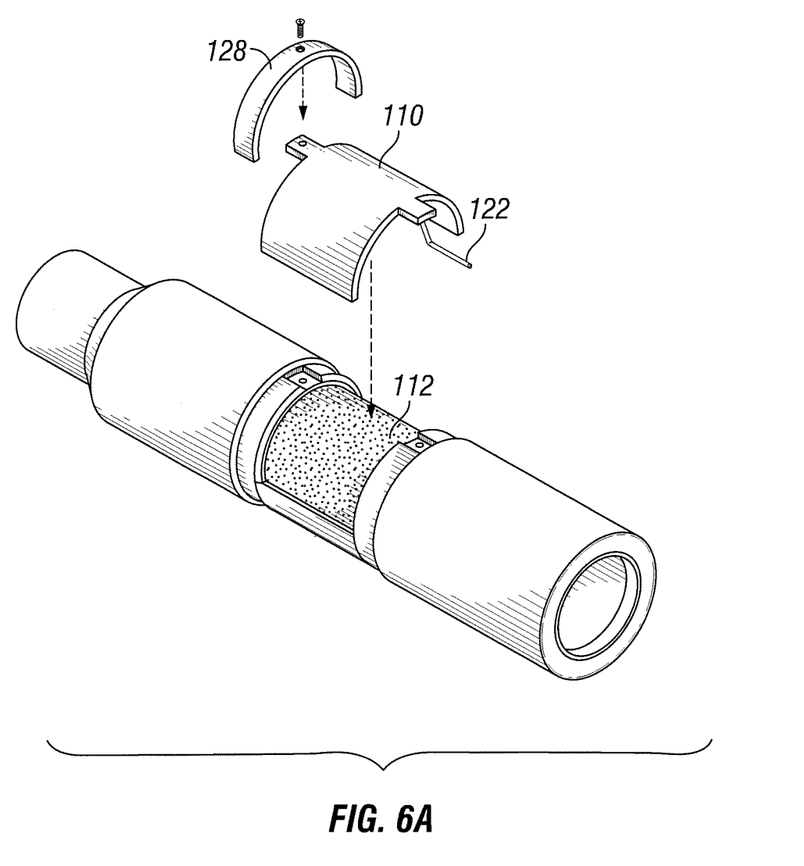
FIGS. 6A-B illustrate an embodiment of electrode attachment to the tool body.
Figure 6B:
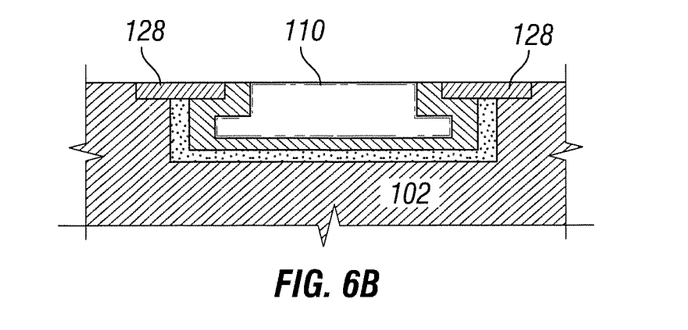

FIG. 6A-B illustrate an embodiment of the sensor having electrodes 110 secured to the tool body 102 with locking rings 128. The locking ring 128 preferably covers the entire edge of the electrode 110. An insulating layer 112 is inserted between the locking ring 128 and the electrode 110. The locking ring 128 is also insulated from the electrode 110 from underneath by non-conducting insulating material 112 such as rubber, PEEK, fiberglass, ceramic, or others. The width of the locking ring 128 is preferably about 0.5 inches, but may be between 0.25 inches and three inches, or greater. The locking ring 128 is attached to the tool body 102 by bolts or by soldering (not shown). To help protect the electrode 110 from wear and tear damage during drilling, wear bands (not shown) may be placed around the electrodes 110.

Referring to Table 1, the predicted signal length as a function of the transmitting-to-receiving electrode spacing ("TR spacing") is calculated. Both transmitting and receiving electrodes may be hollow shaped. A length of the transmitting electrode may be fixed while a length of the receiving electrode may vary ("Rcvr length"). Three different formation resistivity ("$R_t$") values and two different mud resistivity ("$R_{mud}$") values are computed. In this example, the transmitting electrode length is six inches, the tool body outer diameter is five inches, and the borehole diameter is seven inches. The input power is limited to approximately 1 Watt. The signals are in µV. As indicated in Table 1, a longer receiving electrode or a shorter electrode spacing yields stronger signals.

TABLE 1

| | | R$_{mud}$ | | | | | | | | | | |
|---|---|---|---|---|---|---|---|---|---|---|---|---|
| | | 1 ohmm | | | | 10 ohmm | | | | 100 ohmm | | |
| | | R$_t$ | | | | | | | | | | |
| | | 1 ohmm | | 50 ohmm | | 1 ohmm | | 50 ohmm | | 1 ohmm | | 50 ohmm |
| | | TR spacing | | | | | | | | | | |
| | | 30 ft | 60 ft | 30 ft | 60 ft | 30 ft | 60 ft | 30 ft | 60 ft | 30 ft | 60 ft | 30 ft | 60 ft |
| Rcvr length | 2" | 83 | 37 | 2 | 0.8 | 638 | 298 | 59 | 20 | 764 | 384 | 905 | 317 |
| | 6" | 171 | 76 | 6 | 2 | 952 | 444 | 149 | 51 | 1036 | 521 | 1651 | 579 |
| | 12" | 265 | 118 | 12 | 4 | 1152 | 537 | 270 | 93 | 1153 | 580 | 2343 | 822 |
| | 24" | 399 | 177 | 23 | 8 | 1357 | 634 | 478 | 165 | 1236 | 621 | 3225 | 1134 |

Figure 7:
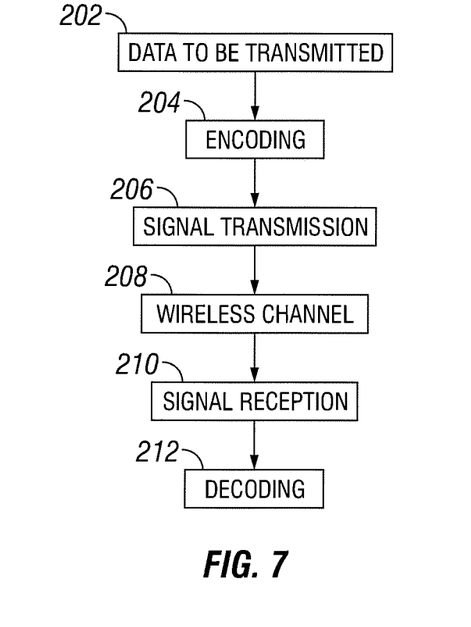
FIG. 7 illustrates a flowchart showing steps of transmitting data using the short-hop sensor.

FIG. 7 illustrates a flow chart showing steps of transmitting data. Data transmission (Step 202) begins with signal encoding (Step 204) in the driving circuits. The encoded signal (current) is driven (Step 206) to the transmitting antenna, in certain embodiments over a wireless channel (Step 208), and received by the receiving antenna (Step 210). The received signal is then decoded (Step 212) to recover the data being transmitted. Common encoding/decoding methods may include but are not limited to amplitude-shift keying (ASK), frequency-shift keying (FSK), phase-shift keying (PSK), binary phase-shift keying (BPSK), and quadrature phase-shift keying (QPSK).

Alternatively, the transmitting or receiving antenna may be constructed with two electrodes mounted near the outer surface of the tool body. For signal transmission, one electrode may be used for current injection and the other for current returning. For signal reception, a voltage difference signal may be measured across the two electrodes. Both electrodes may be constructed and insulated from the tool body in the manner described above for a single electrode.

Figure 8:
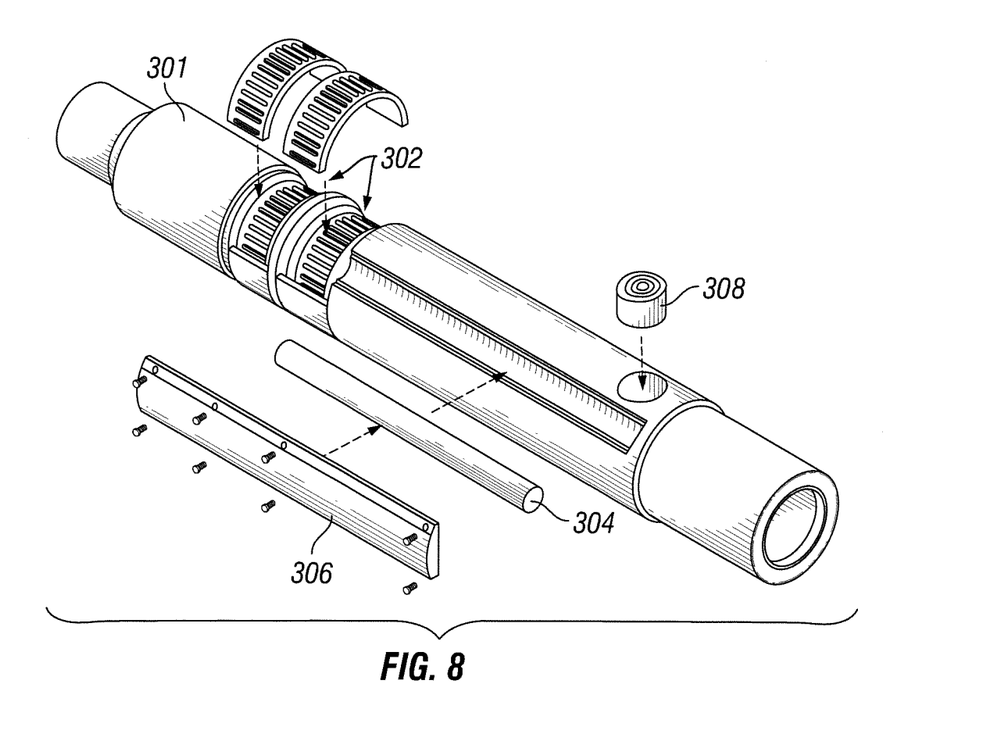
FIG. 8 illustrates an alternative embodiment of a coil-based transmitting antenna with an electrode-based receiving antenna.

FIG. 8 illustrates a downhole tool 301 including one or more coil-based transmitting antennas 302 combined with an electrode-based receiving antenna 304 for short-hop telemetry. That is, the coil-based antennas include a wire winding generating a magnetic moment. The coil-based transmitting antennas 302 broadcast a modulated electromagnetic signal at frequencies from approximately one kilohertz to five hundred kilohertz. The signal then is received by the electrode-based receiving antenna 304 covered by a groove cover 306. The tool 301 may also include a micro-sensitivity imaging sensor 308. Alternatively, an electrode-based transmitting antenna may broadcast a modulated electromagnetic signal that is received by coil-based antennas.

The claimed subject matter is not to be limited in scope by the specific embodiments described herein. Indeed, various modifications of the invention in addition to those described herein will become apparent to those skilled in the art from the foregoing description. Such modifications are intended to fall within the scope of the appended claims.

What is claimed is:

1. A tool for communicating data between multiple locations downhole, the tool comprising: a tool body; a transmitting antenna coupled to the tool body, the transmitting antenna comprising an electrode having an outer surface conductively exposed to drilling fluids and an inner surface electrically insulated from the tool body; an electronic driving circuit configured to generate an encoded electrical signal and propagate the encoded signal through the electrode of the transmitting antenna into a medium surrounding the tool; and, a receiving antenna coupled to the tool body, the receiving antenna comprising an electrode having an outer surface conductively exposed to drilling fluids and an inner surface electrically insulated from the tool body; and an electronic receiving circuit configured to receive an electrical signal induced by the receiving antenna, wherein data is communicated over a channel between the transmitting antenna and the receiving antenna.

2. The tool of claim 1, further comprising an electrical connector extending between the transmitting antenna electrode and the electronic driving circuit that does not contact the tool body.

3. The tool of claim 1, further comprising an electrical connector extending between the electronic driving circuit and the tool body that does not contact the transmitting antenna electrode.

4. The tool of claim 1, wherein the transmitting and receiving antenna electrodes are separated from the tool body by an insulating layer selected from a group consisting of rubber, fiberglass, ceramic, and polyether ether ketone.

5. The tool of claim 4, wherein the insulating layer is between 0.1 inch and one inch in thickness.

6. The tool of claim 1, further comprising an electrical connector extending between the receiving antenna electrode and the electronic receiving circuit that does not contact the tool body.

7. The tool of claim 1, further comprising an electrical connector extending between the electronic receiving circuit and the tool body that does not contact the receiving antenna electrode.

8. The tool of claim 1, wherein at least one electrode comprises a circular, square, rectangular, or oval cross-sectional shape.

9. The tool of claim 1, wherein at least one electrode comprises metal.

10. The tool of claim 1, wherein at least one electrode is between approximately one inch and ten inches in length.

11. A downhole data communication system disposed in a drill string, the system comprising: a transmitting antenna coupled to the drill string comprising: an electrode electrically insulated from the drill string and having an outer surface conductively exposed to drilling fluid and; an electronic driving circuit for generating an electrical signal;
   a first metal wire connecting the electronic driving circuit to the electrode, wherein the first metal wire does not contact the drill string; and a second metal wire connecting the electronic driving circuit to the drill string, wherein the second metal wire does not contact the electrode; and a receiving antenna coupled to the drill string comprising: an electrode electrically insulated from the drill string and having an outer surface conductively exposed to drilling fluid and; an electronic receiving circuit for receiving an electrical potential difference between the electrode and the drill string; a first metal wire connecting the receiving circuit to the electrode, wherein the first metal wire does not contact the drill string; and a second metal wire connecting the receiving circuit to the drill string, wherein the second metal wire does not contact the electrode, wherein data is communicated over a channel between the transmitting antenna and the receiving antenna.

12. The system of claim 11, further comprising a pressure-sealed pocket formed in the drill string for housing the electronic driving and receiving circuits.

13. The system of claim 12, further comprising a pressure-sealed feed-through connector extending between the electrode and pressure-sealed pocket housing the electronic driving circuit.

14. The system of claim 11, further comprising locking rings covering an edge of the electrode for securing at least one electrode to the drill string.

15. The system of claim 11, further comprising mechanical fasteners securing at least one electrode to the drill string.

16. A method of communicating data between multiple locations downhole, the method comprising: providing a tool body comprising a transmitting antenna comprising an electrode having an outer surface conductively exposed to drilling fluid and coupled with an electronic circuit at a first location, and a receiving antenna comprising an electrode having an outer surface conductively exposed to drilling fluid and coupled with an electronic circuit at a second location; encoding a signal comprising data to be transmitted in the electronic circuit of the transmitting antenna; driving the encoded signal to the electrode-based transmitting antenna; transmitting the encoded signal over a communications channel to the receiving antenna through a medium surrounding the tool body; receiving the encoded signal at the receiving antenna; and decoding the signal to recover transmitted data.

17. The method of claim 16, further comprising selecting encoding methods from a group consisting of amplitude-shift keying, frequency-shift keying, phase-shift keying, binary phase-shift keying, and quadrature phase-shift keying.

18. The method of claim 16, further comprising recording the transmitted data in memory for subsequent processing.

19. The method of claim 16, further comprising transmitting the data, without recording, to an additional electronics system.

* * * * *